(No Model.) 3 Sheets—Sheet 2.
L. E. RUSSELL & W. OBENCHAIN.
SELF PROPELLING VEHICLE.
No. 341,858. Patented May 11, 1886.
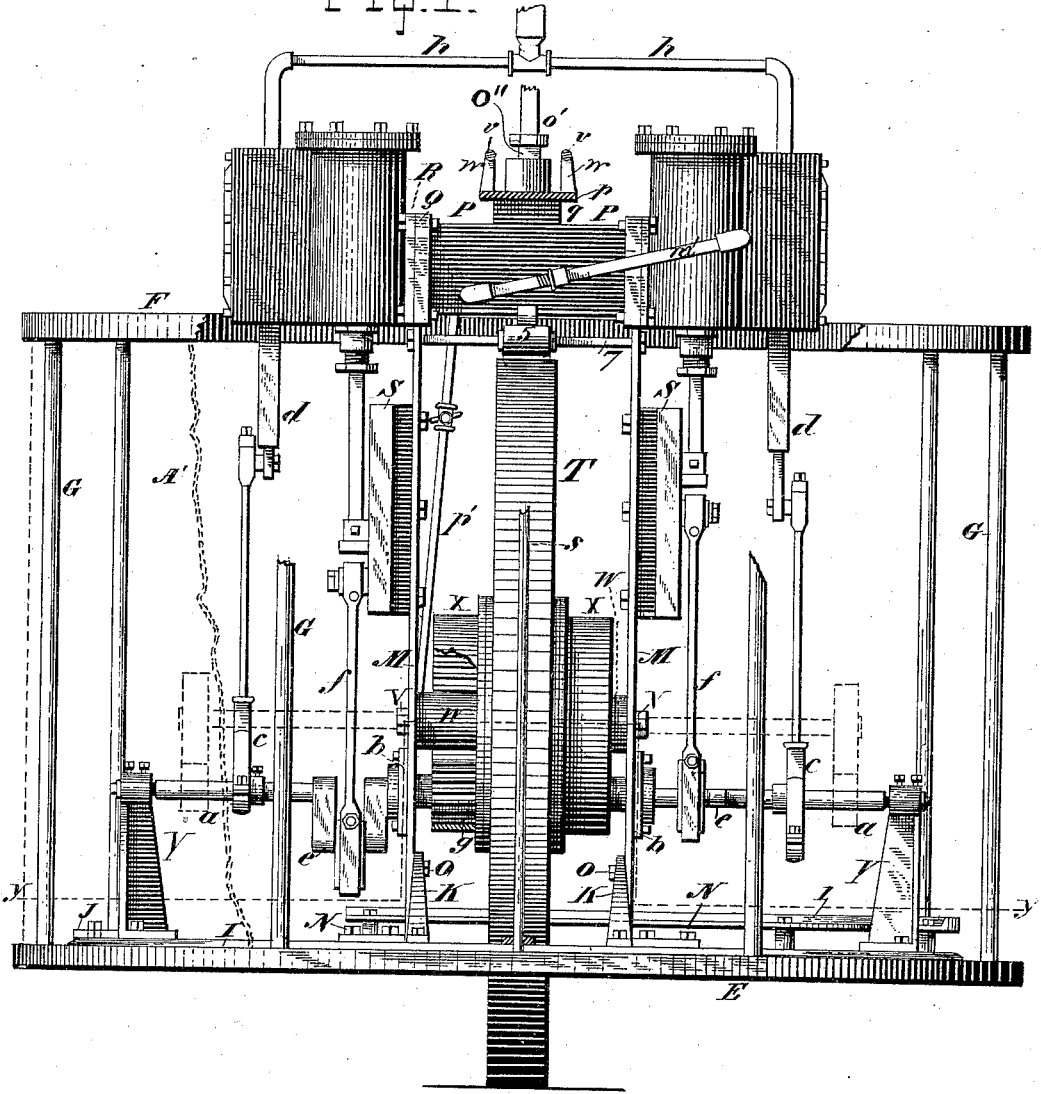
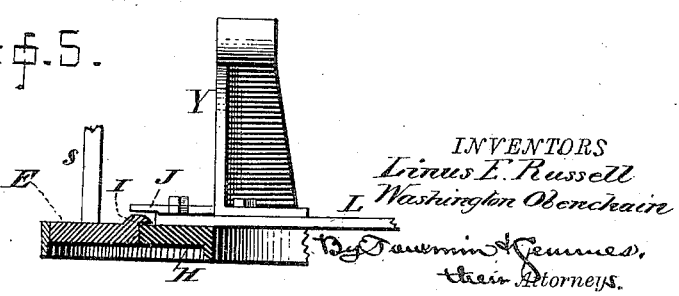
WITNESSES
INVENTORS
Linus E. Russell
Washington Obenchain
their Attorneys.

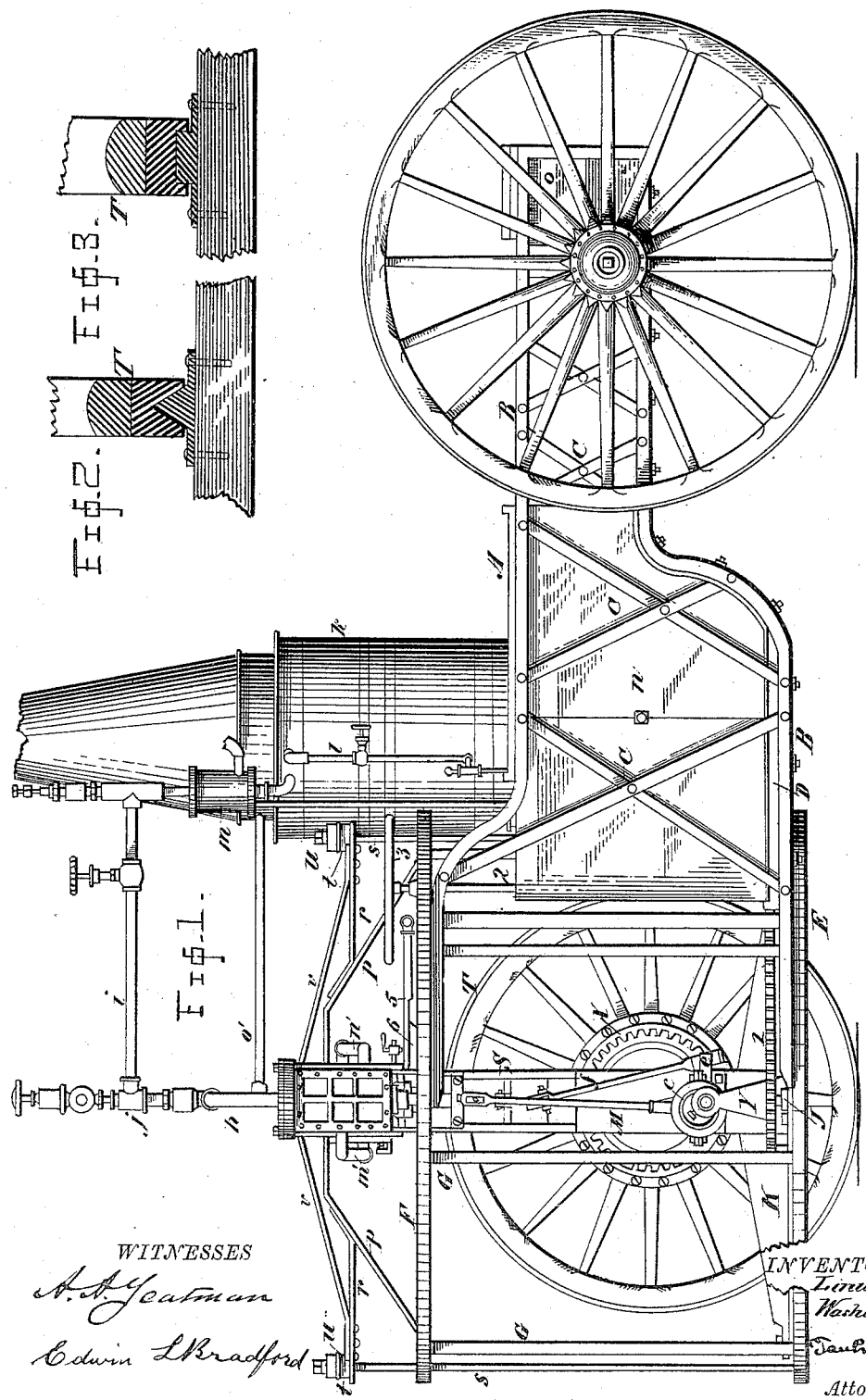

(No Model.) 3 Sheets—Sheet 3.
L. E. RUSSELL & W. OBENCHAIN.
SELF PROPELLING VEHICLE.
No. 341,858. Patented May 11, 1886.
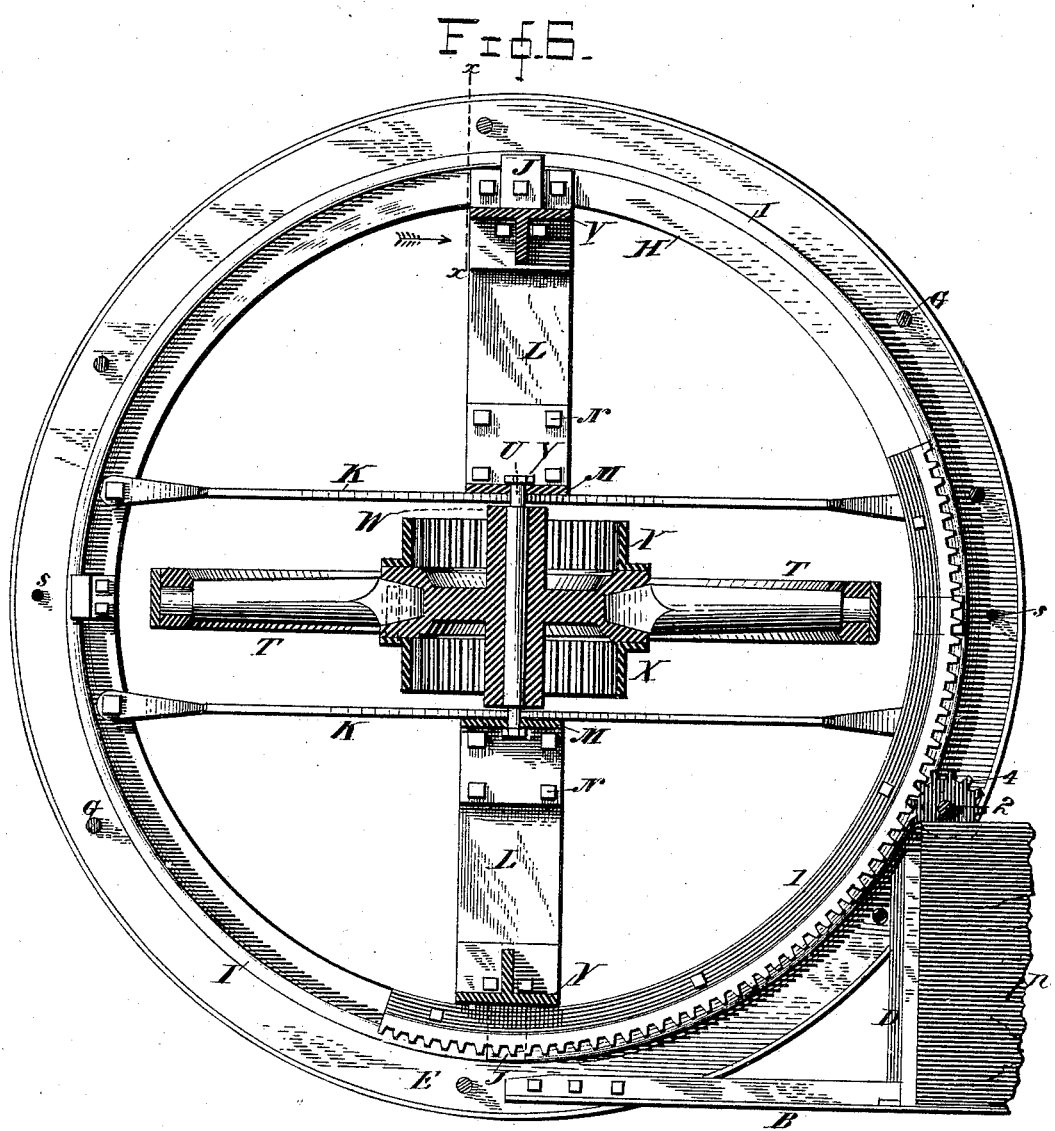
WITNESSES
INVENTORS
Linus E. Russell
Washington Obenchain
By Toulmin & Jummes
their Attorneys

UNITED STATES PATENT OFFICE.

LINUS E. RUSSELL AND WASHINGTON OBENCHAIN, OF SPRINGFIELD, OHIO.

SELF-PROPELLING VEHICLE.

SPECIFICATION forming part of Letters Patent No. 341,858, dated May 11, 1886.

Application filed March 8, 1886. Serial No. 194,489. (No model.)

*To all whom it may concern:*

Be it known that we, LINUS E. RUSSELL and WASHINGTON OBENCHAIN, citizens of the United States, residing at Springfield, in the county of Clark and State of Ohio, have invented certain new and useful Improvements in Self-Propelling Road-Vehicles, of which the following is a specification, reference being had therein to the accompanying drawings.

This invention relates to improvements in self-propelling road-vehicles, and is designed to afford a means of travel from place to place, having a view to draw other vehicles constructed with accommodations for passengers, and is particularly designed as a means of locomotion for street-railway cars, and has for its objects, first, to combine the traction and steering wheel in one wheel, and to provide it with operating mechanism in such wise that said mechanism will accommodate itself to the various lateral directions of the traction-wheel itself; second, to provide a combined traction and steering wheel with operating mechanism adapted to be supported directly by said wheel, and to mount the frame of the machine upon said wheel in such manner as to allow the wheel, with its operating mechanism, to be turned in any direction; and, third, to provide the traction and steering wheel with a tire of such construction as to maintain the wheel upon the track.

In the accompanying drawings, forming a part of this specification, and on which like reference-letters indicate corresponding parts, Figure 1 represents a side elevation of our improved vehicle; Fig. 2, a transverse sectional view of the traction-wheel tire and rim, and of a track; Fig. 3, a like view showing another form of tire and track; Fig. 4, a front view of the traction and guiding wheel and the operating-engines, as also of the attached devices in the front portion of the main frame; Fig. 5, a sectional view of the circular frames on the line $x\,x$, looking in the direction of the arrow, and Fig. 6 a plan of the circular frames, showing a portion of the bottom, and the standards and traction and guiding wheel in horizontal section on the line $y\,y$ of Fig. 4.

The letter A designates the frame generally of the vehicle, consisting of the open-work sides constructed of upper and lower bars, B, in the form of angle-irons, having suitable oblique braces, C, and a convenient flooring, D. The lower side bars are bolted or otherwise secured to a circular frame or rim, E, of wrought or cast metal, and the upper side bars are similarly secured to an upper rim or frame, F, and the two rims are connected together by uprights G.

The letter H designates a metallic rim, which forms a part of the wheel-frame, and which fits within the rim E in such manner as to freely turn, as will be explained farther on, an annular overhanging bead, I, being formed on the latter rim and extended slightly over the former, to prevent the rim E from descending below the rim H when unusual weight is brought upon the frame proper of the machine. The space between the head I and the rim H admits of the action of the springs, to be presently described. A series of plates, J, are connected with the rim H, and stand over the bead I, to prevent the rim E from jolting above the rim H. Extending across the rim H in line with the longitudinal center of the machine are girders K, consisting of metallic bars placed edgewise and strongly secured to that rim, while in the opposite direction brace bars or plates L are placed and connected with the rim H and with standards M by means of bolts N, the lower ends of the standards being bent horizontally for this purpose. These standards are secured, as by bolts O, to the girders K, at their lower ends and about midway the length of the girders, while at their upper ends the standards are connected together by a head, P, constituting a yoke, which stands over the traction-wheel, and which is preferably hollow to constitute an exhaust-chamber for the engines, the cylinders being connected thereto, preferably by the flanges Q and R and suitable bolts. By this means the cylinders, their steam-chests, and steam-pipes are supported. To the standards M are also secured the guides S, or the crossheads of the engine-pistons. The traction and guiding wheel T has its shaft U fitted to bearings formed in the said standards, and held in place in the present instance by suitable nuts. The wheel has a heavy metallic hub, into which the spokes enter, and which is fashioned into a long sleeve, W, within which the shaft U is fitted, the length of the sleeve serving to prevent the wheel from losing its vertical position. Cast integrally with the hub, or separately, and connected thereto are rims X, having interior cog-teeth, with which operating-pinions engage, as will shortly appear.

Mounted upon the braces L are standards Y, at diametrical points, and opposite the ends of the shaft U, in the upper ends of which are constructed bearings for the engine-shafts $a$, while in the standards M, at points opposite the said bearings, are constructed further bearings, $b$, for the support of the inner ends of the engine-shafts. These shafts carry the usual eccentrics, $c$, which serve to operate the valve-rods $d$, and are each provided with a crank, $e$, with which the engine-pitmen $f$ connect, whereby rotary motion is imparted to the shafts from the engine. Each is further provided with a pinion, $g$, meshing with the respective cog-rims X, by which rotary motion is imparted to the traction and guiding wheel.

This particular type of engine is not essential to the invention, nor is it necessary that steam only be employed as the motive agent, since the use of a gas or other engine, the proper supply of the motive agent for which can be had under the circumstances, may be employed. The present engines are designed to be operated by steam, supplied in the manner presently to appear, and conducted to the steam-chests through the pipes $h$ and $i$, the point between which, at the point $j$, being such as to admit of the pipes $h$ being turned to any extent in either direction with respect to the pipe $i$, and suitable cocks are supplied for admitting and cutting off the steam-supply.

The boiler $k$ may of course be of any approved type, an upright boiler being preferred. It is carried upon the floor of the vehicle and is supplied with a feed-pump and a supply-pipe, $l$. (The latter only being shown.) We prefer to connect a vessel, $m$, with the steam-space of the boiler and to take the steam for the cylinder from it, as we have ascertained that, from jarring or other cause, foam collects in the steam-pipes without the intervention of said vessel. The steam exhausts through the pipes $m'$ and $n'$ into the hollow yoke P, and thence through the pipe $o'$, which communicates with the interior of the yoke and with the stack of the boiler. The pipe $o'$ connects with the yoke P by screwing into the boss $o''$, whereby the yoke is allowed to turn in either direction, said connection being axially over the wheel T. The exhaust-steam may be allowed to issue through the pipe $p'$, which extends near the ground.

The letter $n$ represents a metallic tank for the water from which the boiler is supplied, and the letter $o$ another metallic tank in which a supply of petroleum is carried, as we have found that this form of fuel is very desirable. Any special construction relating to these features is outside of the present case, however.

It has already been noted that the space between the rim H and the head I permits of the action of the springs. These springs consist of the leaf $p$, secured at either end to the rim F, and passing over and resting upon a boss, $g$, on the top of the yoke P. To this leaf are connected flexible plates $r$, through the free ends of which the respective suspension-rods $s$, the lower ends of which strongly connect with the rim E, and upon the plates $r$ are placed metallic washers $t$, upon which rest springs—as rubber bumpers $u$—and upon the latter other washers, and finally upon these the nuts which engage the upper ends of said rods. To add strength and give a greater rigidity to the springs, are provided steel rods $v$, connecting with the plates $r$ and passing over short standards $w$, mounted upon the leaf $p$. This structure, it will be observed, connects the main frame and its rims F and E with the yoke over the traction-wheel, and affords a cushion-like yet strong connection, while the wheel and frame are kept in the proper relative position at the bottom by the rims H and E. Secured to the rim H is a segmental rack-bar, 1, and in proximity to the bar, in bearings carried by the rims E and F, is mounted a shaft, 2, having a hand-wheel, 3, and a pinion, 4, which engages with the rack-bar, and by which, being of small diameter, while the rack-bar is at a considerable radius from the center of the wheel, ample leverage is acquired to easily manage the steering operation. This means forms a convenient one for steering; but we do not wish to confine ourselves to it, as other means may be adopted.

The wheel-shaft may be extended out, as shown in dotted lines in Fig. 4, and gear-wheels mounted thereon and adapted to engage with pinions mounted on engine-shafts, as also seen in dotted lines, in lieu of the pinions $g$ and the cog-rims X. This change will apply the driving-power to the wheel-shaft and necessitate the mounting of the wheel rigidly thereon. For general road purposes a flat tire of sufficient width is found preferable, but in applying the vehicle to drawing street-cars the form of tires shown in Figs. 2 and 3 are preferred, and the track there shown is designed to be laid as a third track, upon which the traction-engine and guiding-wheel will run, while the remaining wheels will travel upon ordinary rails.

The fact that the essential weight of the entire vehicle, and especially the weight of the operating mechanism, is borne by the traction-wheel, gives it increased traction-power.

We do not wish to be understood as limiting ourselves to the special construction shown, as it may be widely varied, for the essential feature is a combined traction and guiding wheel. Any suitable brake may be employed; but one form is shown, consisting of a lever, 5, having a shoe, 6, adapted to engage the traction-wheel when the lever is depressed, the lever being pivotally mounted upon a bar, 7, journaled to the standards M. A housing of sheet metal may be employed to envelop the operating mechanism, as seen in Fig. 4, and represented by A'.

It will be observed that the standards M, being connected to the lower rim, E, of the frame and to the upper rim, F, by means of the springs p, and by reason of the wheel T being mounted in said standards between said rims, as a consequence the frame of the machine is connected with said wheel above and below its axis. This is of value, as it prevents lateral sway of the machine when traveling in a curve.

Having thus fully described our invention, what we claim as new, and desire to secure by Letters Patent, is—

1. The combination, with a wheel suitably mounted, and a vehicle supported at one end by said wheel and connected thereto above and below the axis thereof, of operating-engines carried by and geared to the said wheel and adapted to move with it in its various directions, and mechanism to guide the wheel, whereby a traction and guiding wheel is constituted of a single wheel.

2. The combination, with a wheel suitably mounted, of an operating-engine carried thereby and geared thereto independently of the shaft of the wheel and adapted to move with the wheel in its various directions, and the guiding mechanism to guide the wheel, whereby a traction and guiding wheel is constituted of a single wheel.

3. The combination, with a wheel suitably mounted, and a vehicle supported at one end by said wheel and connected thereto above and below the axis thereof, of an operating-engine carried directly thereby and geared thereto independently of the shaft of the wheel and adapted to move with the wheel in its various directions, and guiding mechanism to guide the wheel, whereby a traction and guiding wheel is constituted of a single wheel.

4. The combination, with a wheel suitably mounted and having cog-rims, of an engine carried directly thereby and having shafts geared to said rims, the engine being adapted to move with the wheel in its various directions.

5. The combination, with a wheel suitably mounted and having cog-rims, of an engine carried directly thereby and having shafts geared to said rims, the engine being adapted to move with the wheel in its various directions, and a segment connected with the wheel-mountings, and a hand-wheel, its shaft and pinion, whereby a traction and guiding wheel is constituted of one wheel.

6. The combination, with a wheel and a vehicle-frame supported at one end thereby and having cog-rims, of an engine carried directly by said wheel and having shafts geared to said rims, the engine being adapted to move with the wheel in its various directions, and a segment connected with the wheel-mountings, and a shaft mounted upon the vehicle-frame and having a pinion and hand-wheel, whereby a traction and guiding wheel is constituted of one wheel.

7. The combination, with the wheel, the rim supported thereby, and the standards, of the upper and lower rims of the vehicle-frame connected together, the yoke, the springs, and the suspension-rods connected with the springs and with the lower frame-rim.

8. The combination, with a wheel suitably mounted, of operating mechanism carried directly by said wheel over its axis and geared thereto independently of and eccentrically to its shaft and adapted to move with the wheel in its various directions, and guiding mechanism, whereby a traction and guiding wheel is constituted of a single wheel.

9. The combination, with a wheel suitably mounted and a vehicle-frame connected with the wheel, of operating mechanism carried directly by said wheel vertically over its axis and geared thereto independently of and eccentrically to its shaft and adapted to move with the wheel in its various directions, and guiding mechanism, whereby a traction and guiding wheel is constituted of a single wheel.

10. The combination, with a wheel, a rim surrounding it, girders extending across the rim, lateral braces and vertical standards in which the wheel-shaft is mounted, of engine-cylinders and a hollow yoke connected together and mounted upon the said standards, and the engine-shafts geared with said wheel independently of and eccentrically to its shaft.

11. The combination, with a wheel carrying cog-rims and a horizontal rim surrounding the wheel, girders extending across the horizontal rim, lateral braces, and vertical standards in which said wheel is mounted, of engine-cylinders and a hollow yoke secured together and mounted upon the said standards, the engine-shafts having pinions meshing with said cog-rims and mounted in said standards and in other standards carried by the horizontal rim.

12. The combination, with the engine-cylinders and the hollow yoke forming the exhaust-chamber connected to the cylinders, of the standards upon which the cylinders and the yoke are mounted, and the rim and girders which support said standards.

13. The combination, with the horizontal rim surrounding the wheel and the wheel supporting said rim, of the upper and the lower rims of the vehicle-frame, the latter fitting the horizontal rim, and uprights connecting the frame-rims together.

In testimony whereof we affix our signatures in presence of two witnesses.

LINUS E. RUSSELL.
WASHINGTON OBENCHAIN.

Witnesses:
 A. A. YEATMAN,
 CHASE STEWART.